United States Patent [19]

Everetts et al.

[11] Patent Number: 5,702,493

[45] Date of Patent: Dec. 30, 1997

[54] WELDING FUME FUNNEL WITH MAGNETIC COUPLING MEANS

[76] Inventors: Randy Roger Everetts, R.R. #2, Box 424, Tunkhannock, Pa. 18657; Charles Clinton Everetts, R.R. #1, Box 320, Dallas, Pa. 18612

[21] Appl. No.: 742,210

[22] Filed: Oct. 31, 1996

Related U.S. Application Data

[60] Provisional application No. 60/006,198, Nov. 2, 1995.

[51] Int. Cl.⁶ ............................................. B01D 46/12
[52] U.S. Cl. .................... 55/356; 55/357; 55/385.1; 55/418; 55/471; 55/481; 55/485; 55/506; 55/DIG. 6; 55/DIG. 18; 454/63; 454/66
[58] Field of Search ........................... 55/385.1, 385.2, 55/383, 418, 419, 467, 471, 472, 473, 481, 506, 485, 356, 357, DIG. 3, DIG. 6, DIG. 18, DIG. 29; 95/273, 284; 454/49, 56, 57, 63, 65, 66, 67

[56] References Cited

U.S. PATENT DOCUMENTS

| | | | |
|---|---|---|---|
| D. 329,081 | 9/1992 | Jonasson et al. | D23/209 |
| 2,115,482 | 4/1938 | Crewe | 55/467 |
| 2,421,469 | 6/1947 | Smith | 454/67 |
| 2,772,625 | 12/1956 | Clark, Jr. | 454/63 |
| 3,096,933 | 7/1963 | Bora | 454/63 |
| 3,382,651 | 5/1968 | Hahl et al. | 55/337 |
| 3,626,545 | 12/1971 | Sparrow | 15/314 |
| 3,898,414 | 8/1975 | Hawley | 55/385.1 |
| 3,902,999 | 9/1975 | Hawley | 210/90 |
| 3,926,104 | 12/1975 | El Dorado | 55/385.2 |
| 3,973,932 | 8/1976 | Alskog | 55/481 |
| 4,163,650 | 8/1979 | Watson et al. | 55/467 |
| 4,287,405 | 9/1981 | Ohmae et al. | 454/63 |
| 4,512,245 | 4/1985 | Goldman | 55/472 |
| 4,573,464 | 3/1986 | Yo | 128/206.15 |
| 4,617,033 | 10/1986 | Strang | 454/63 |
| 4,723,971 | 2/1988 | Caldas | 55/357 |
| 4,976,850 | 12/1990 | Kulitz | 364/424.055 |
| 5,036,754 | 8/1991 | Simms et al. | 454/65 |
| 5,085,133 | 2/1992 | Hickling et al. | 454/63 |
| 5,125,939 | 6/1992 | Karlsson | 55/473 |
| 5,129,926 | 7/1992 | Harwell | 96/136 |
| 5,281,246 | 1/1994 | Ray et al. | 55/356 |
| 5,511,764 | 4/1996 | Wonsetler | 55/DIG. 18 |

FOREIGN PATENT DOCUMENTS

| | | | |
|---|---|---|---|
| 1278115 | 10/1961 | France. | |
| 828 317 | 1/1952 | Germany. | |
| 52-28775 | 3/1977 | Japan | 454/63 |
| 54-157385 | 12/1979 | Japan | 55/385.1 |

*Primary Examiner*—Duane S. Smith
*Attorney, Agent, or Firm*—Richard C. Litman

[57] ABSTRACT

A smoke removal device, especially designed for use in welding, having one or more portable funnels, with a wide opening through which suction may be directed to remove smoke from particular areas where combustion is taking place, and a narrow opening opposite to the wide opening, a vacuum device for creating the suction by which the smoke is removed, the vacuum device having an inlet valve for each funnel, and hoses connecting the narrow opening of each portable funnel to one of the inlet valves of the vacuum device. In a preferred embodiment, the portable funnel is connected to a base containing magnets. The funnel is connected to the base by a first cylinder extending downward from the funnel, with the first cylinder fitting inside a second cylinder attached to the base, with the funnel and first cylinder being rotatable in relation to the base and the second cylinder. A wheeled, multifilter carriage is provided to clean smoke coming from the funnel before it is exhausted into the surrounding air.

9 Claims, 3 Drawing Sheets

WELDING FUME FUNNEL WITH MAGNETIC COUPLING MEANS

CROSS REFERENCE TO RELATED APPLICATION

This application is based on Provisional Patent Application Ser. No. 60/006,198, filed Nov. 2, 1995, now abandoned.

BACKGROUND OF THE INVENTION

1. FIELD OF THE INVENTION

The present invention relates to a funnel, filter and vacuum device for removing fumes from an enclosed space, e.g., from a work area during welding.

2. DESCRIPTION OF THE PRIOR ART

There are numerous prior inventions for vacuuming and filtering devices. But there is a need, especially in welding work areas, for a vacuum and air filter device that can concentrate its suction in the places where the fumes are being produced, as by welding. No prior art achieves this as well as the present invention, which consists of one or more large funnels that can easily be located where needed in a welding work area, with the funnels connected by hoses to a vacuum and filter device.

U.S. Pat. No. 3,382,651, issued on May 14, 1968, to Charles W. Hahl and Jesse R. Brown, discloses an air cleaner, in which separation of dust by filtering and by centrifugal force both take place within one housing. It is also distinguishable from the instant invention in that it does not have a funnel that can be placed at a distance from the filtering device.

U.S. Pat. No. 3,626,545, issued on Dec. 14, 1971, to Perry W. Sparrow, discloses a central vacuum cleaner with remote control, in which a vacuum cleaner hose can be connected to separately located outlets. It is distinguishable from the instant invention in that it does not have a large funnel for sucking in fumes.

U.S. Pat. No. 3,902,999, issued on Sep. 2, 1975, to Clyde W. Hawley, discloses a filter unit for a welding apparatus, which is distinguishable from the instant invention in that it does not include a funnel external to the filter unit.

U.S. Pat. No. 4,573,464, issued on Mar. 4, 1986, to Bynyo Yo, discloses a filter respirator for protection against smoke and toxic gasses, which is to be worn over the user's face.

U.S. Pat. No. 4,976,850, issued on Dec. 11, 1990, to Gueater Kulitz, discloses a suction apparatus, which is distinguishable from the instant invention in that it does not include a large funnel that may be placed at a distance from the suction chamber.

U.S. Pat. No. 5,129,926, issued on Jul. 14, 1992, to James E. Harwell, discloses an engine exhaust system, in which a water-filled scrubber tank is used to filter the exhaust.

U.S. Pat. No. Des. 329,081, issued on Sep. 1, 1992, to Alf I. S. Jonasson and Per N. Hedlund, discloses an ornamental design for a mobile electrostatic air filter for use in welding projects, but does not disclose a funnel that may be placed at a distance from the air filter, as in the instant invention.

German Patent No. 828 317, issued on Jan. 17, 1952, to Dr. Martin Rosenmüller, discloses a filter for an internal combustion engine.

French Patent No. 1.278.115, issued on Oct. 30, 1961, to the Donaldson Company, Inc., discloses a filter for an internal combustion engine.

None of the above inventions and patents, taken either singly or in combination, is seen to describe the instant invention as claimed.

SUMMARY OF THE INVENTION

Accordingly, it is a principal object of the invention to provide an improved means for removing fumes or toxic smoke produced in a relatively small area from a work place.

It is another object of the invention to provide a means for accomplishing the foregoing object for several workers in a work place.

It is a further object of the invention to provide a funnel for removing fumes which can be easily relocated.

Still another object of the invention is to provide a vacuum and filter device for the funnel which can be easily cleaned, and in which the filters may be easily changed.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a device for removing smoke from an enclosed area, in particular, for removing fumes from welding.

Figure 1:
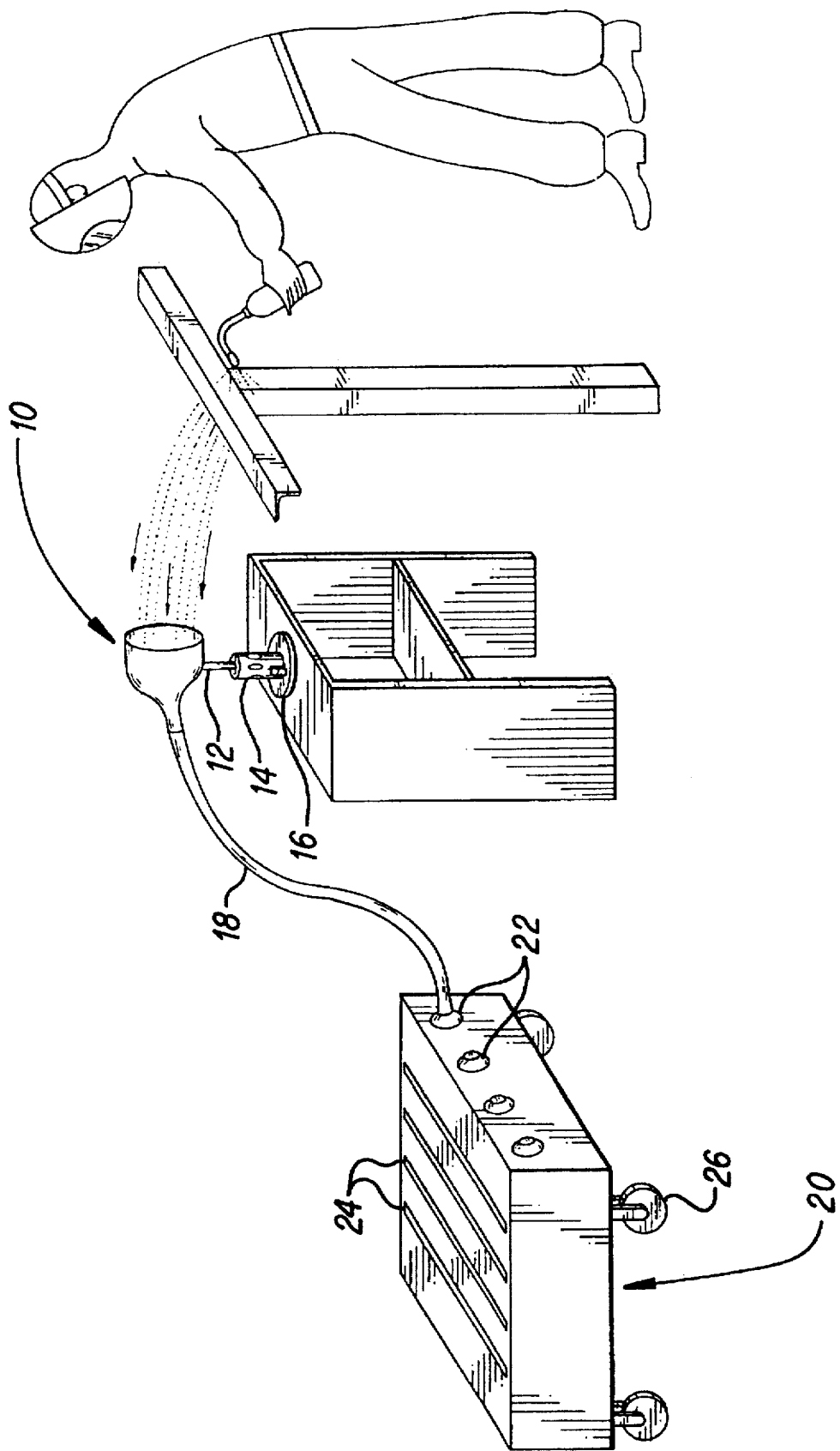
FIG. 1 is environmental perspective view of the invention.

FIG. 1 is an overview of the invention, showing how it might be placed when used by a welder. The invention comprises the fume funnel 10, extending from the bottom of which is a narrow cylinder 12, which fits inside a larger cylinder 14 attached to base 16. The smoke is sucked through the rear of the funnel through a hose 18, which is attached to a vacuum and filter device 20, at one of several inlet valves 22. There are several valves so that several fume funnels can be used by different welders at one job site with a single vacuum and filter device. The vacuum and filter device has several slots 24 for filters, and is mounted on wheels 26 so that it can be easily moved about.

Figure 2:
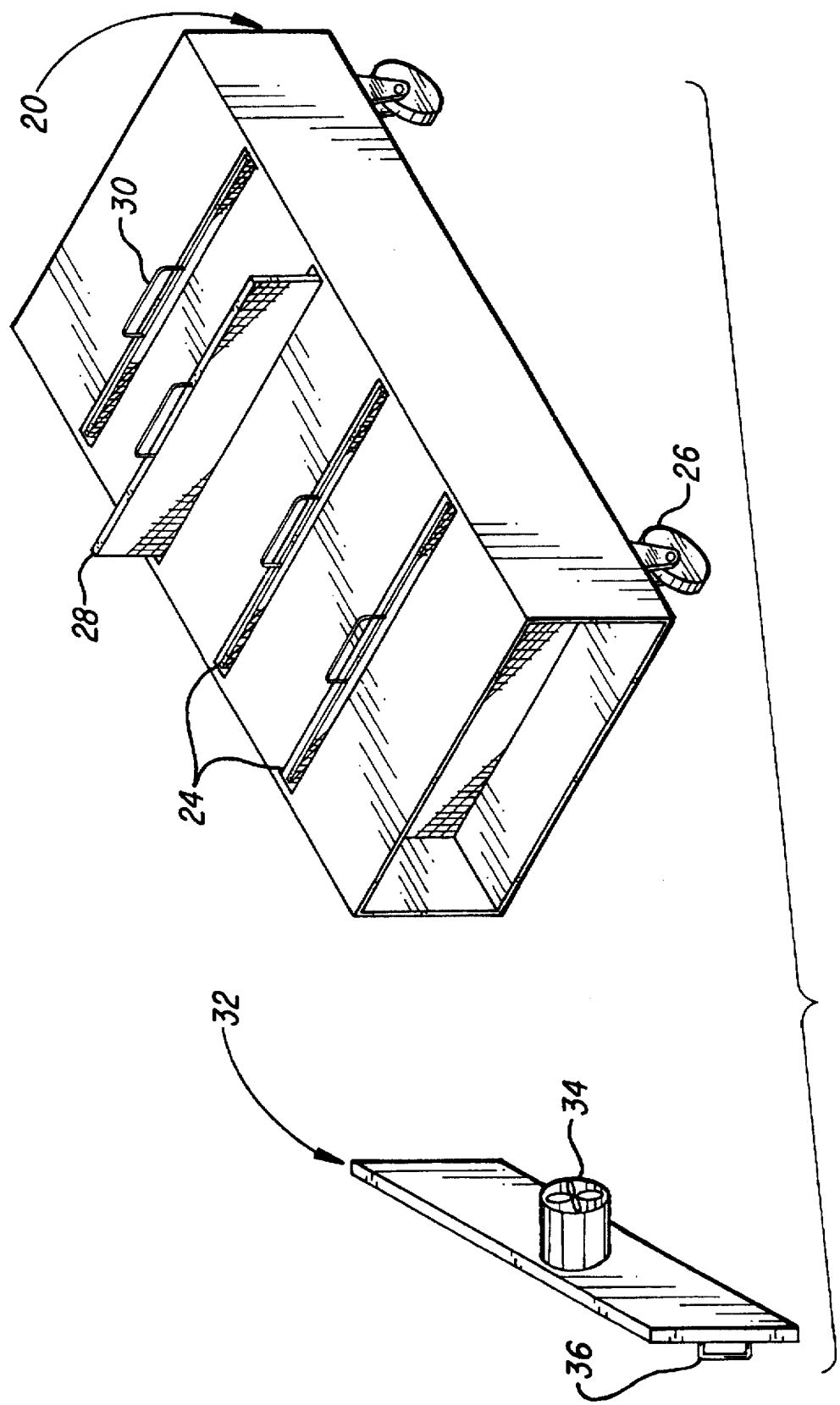
FIG. 2 is a perspective view of the vacuum and filter device of the invention, showing its door removed.

FIG. 2 shows the vacuum and filter device 20 in more detail. In each of the several slots 24 a filter 28 is inserted. (One filter is raised for a better view.) Each filter has a handle 30 so that it can be more easily removed for cleaning or replacement. Also shown is the removable door 32, to which is attached a motorized fan 34, which creates the suction. The door has at least two handles 36 so that it can be more easily opened. (One handle is hidden from view.) The door is on the side opposite the inlet valves. The smoke is sucked in the funnel, through the hose, inlet valves, and the several filters, and out through an outlet in the door (not shown). Sucking the air through several filters insures that more particles are removed from it before it is expelled from the outlet in the door. The positioning of the motorized fan on the door means that inside of the vacuum and filter device can be easily cleaned when the door and filters are removed.

Figure 3:
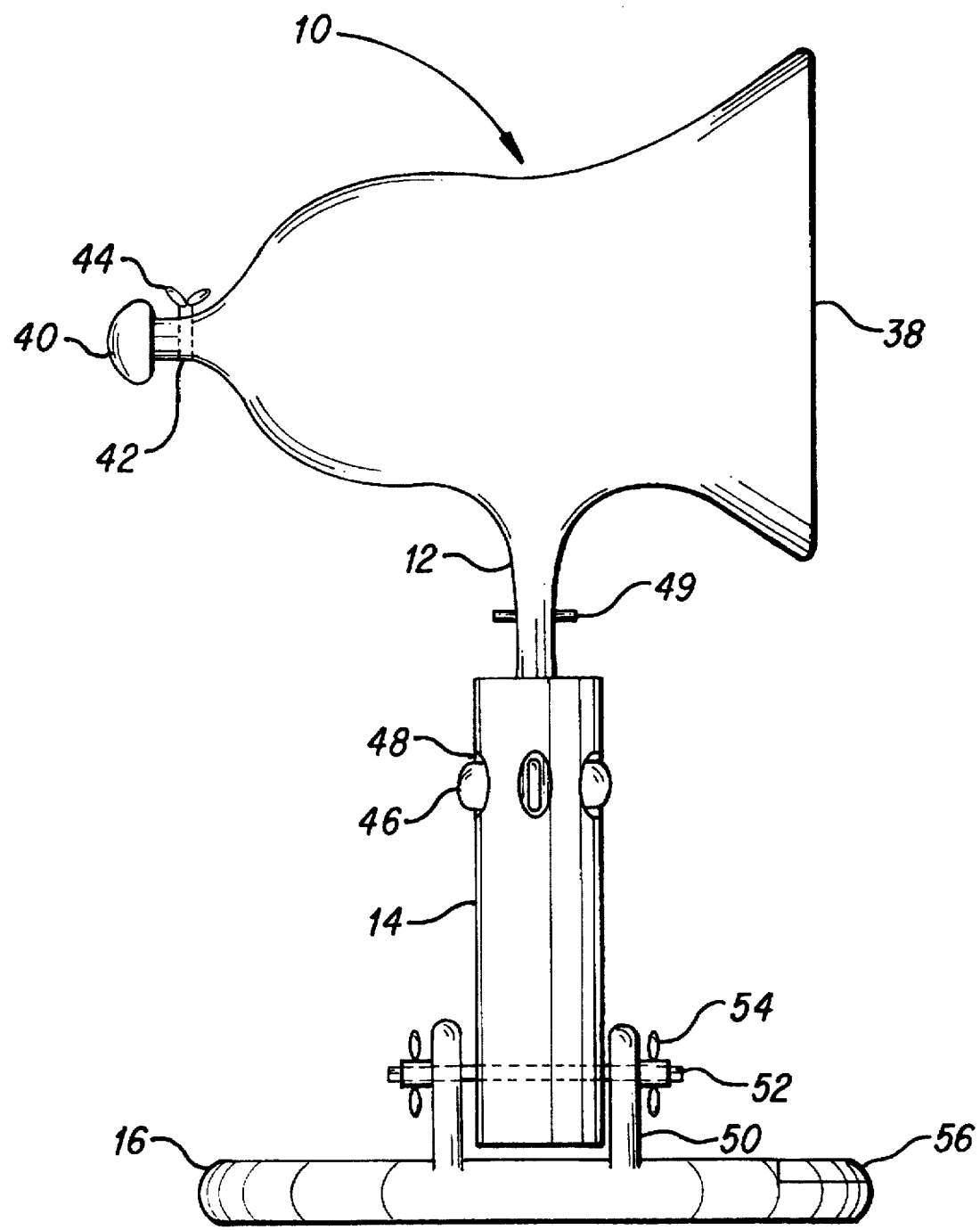
FIG. 3 is a side elevational view of the fume funnel, drawn to an enlarged scale.

FIG. 3 shows the fume funnel 10 in more detail. The narrow cylinder 12 rotates inside the larger cylinder 14 so that the horizontal angle of the funnel can be adjusted to point the wide opening 38 at the place where the smoke is coming from. The hose is attached at the narrow opening 40, within which is a valve 42 that can be turned by a single wing nut 44 to adjust the amount of suction in a particular funnel. There are prongs 46 extending from the narrow cylinder through holes 48 in the broader cylinder. The prongs may be retracted by a push button switch 49, so that the funnel can be rotated horizontally. The prongs can be pushed out again using the same switch, when the funnel is pointing in the desired direction, so the it will be fixed in place. There are two vertical projections 50 extending from the base 16. A bolt 52 passes through holes in the projections and the broader cylinder, so that the vertical angle of the cylinders and the funnel may be pivotally adjusted. The bolt has screw threads on each of its two ends, so that it may be retained in the desired placed by tightening the pair of wing nuts 54. The narrow cylinder does not extend so far down into the broader cylinder that it contacts the bolt. Within the base 16 are magnets (not shown) so that it may be more securely retained on a metallic surface. The magnets may be raised within the base by depressing a lever 56, so that the funnel may be more easily relocated.

It is to be understood that the present invention is not limited to the sole embodiment described above, but encompasses any and all embodiments within the scope of the following claims.

We claim:

1. A smoke removal device, comprising:

a portable funnel having a wide opening and an opposing narrow opening;

a base for supporting said portable funnel;

a magnet contained within said base for removably mounting said base to a supporting metallic surface;

a lever for raising and lowering said magnet within said base;

a vacuum device including:
   a housing having an inlet valve and an outlet,
   a plurality of filters arranged in series within said housing between said inlet valve and said outlet, and
   a motorized fan located within said outlet;

a hose connecting said narrow opening of said portable funnel to said inlet valve of said vacuum device; and a flow control valve in said narrow opening of said portable funnel for controlling the amount of flow through said portable funnel.

2. The smoke removal device according to claim 1, further comprising:

a first cylinder connected to said portable funnel; and a second cylinder connecting said base to said first cylinder, said first cylinder fitting inside said second cylinder, said first cylinder being rotatable in relation to said second cylinder.

3. The smoke removal device according to claim 2, further comprising:

a plurality of holes through said second cylinder;

a plurality of prongs extending from said first cylinder and through said plurality of holes; and a push button release on said first cylinder for retracting said plurality of prongs, thereby allowing said first cylinder to adjustably rotate within said second cylinder.

4. The smoke removal device according to claim 2, further comprising:

a pair of vertical extensions extending from said base, said vertical extensions having holes therethrough;

said second cylinder having a hole therethrough; and a bolt extending through said holes in said vertical extensions and said hole in said second cylinder, said bolt having two screw-threaded ends with wing-nuts fastened thereto for pivotally adjusting said second cylinder.

5. The smoke removal device according to claim 1, wherein:

said housing includes a plurality of slots, the plurality of filters fitting through said plurality of slots; and each said plurality of filters includes a handle extending therefrom, whereby said plurality of filters can be removed from said plurality of slots.

6. The smoke removal device according to claim 1, wherein said vacuum device has a removable door, said outlet being through said removable door, and said motorized fan being attached to said removable door.

7. The smoke removal device according to claim 1, wherein said vacuum device is supported by a plurality of wheels.

8. The smoke removal device according to claim 6, wherein said removable door includes at least two handles.

9. The smoke removal device according to claim 1 wherein said housing has a plurality of inlet valves thereon.

* * * * *